(12) United States Patent
Haupt et al.

(10) Patent No.: US 12,409,711 B2
(45) Date of Patent: Sep. 9, 2025

(54) REINFORCEMENTS AND SUPPORT BRACKETS FOR VEHICLE DOORS

(71) Applicants: Nissan North America, Inc., Franklin, TN (US); Nissan Motor Co., Ltd., Yokohama (JP)

(72) Inventors: James Haupt, Livonia, MI (US); Richard Dryja, Canton, MI (US); Masayuki Onodera, Kanagawa (JP)

(73) Assignees: Nissan North America, Inc., Franklin, TN (US); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/612,555

(22) Filed: Mar. 21, 2024

(65) Prior Publication Data

US 2024/0227521 A1    Jul. 11, 2024

Related U.S. Application Data

(63) Continuation of application No. 17/682,031, filed on Feb. 28, 2022, now Pat. No. 11,964,548.
(Continued)

(51) Int. Cl.
*B60J 5/10*      (2006.01)
*E05D 15/46*    (2006.01)

(52) U.S. Cl.
CPC .............. *B60J 5/107* (2013.01); *E05D 15/46* (2013.01)

(58) Field of Classification Search
CPC . B60J 5/107; B60J 5/101; B60J 5/106; B62D 33/027; E05D 15/46; E05F 15/622
(Continued)

(56) References Cited

U.S. PATENT DOCUMENTS

| 8,727,422 B2 * | 5/2014 | Iwabuchi ................ B60J 5/107 |
| | | 296/106 |
| 8,979,170 B2 | 3/2015 | Kurita et al. |

(Continued)

FOREIGN PATENT DOCUMENTS

| CN | 202593239 U | 12/2012 |
| CN | 203974493 U | 12/2014 |

(Continued)

OTHER PUBLICATIONS

Umeda (JP 2015020471 A), machine translation (Year: 2015).*

*Primary Examiner* — Amy R Weisberg
*Assistant Examiner* — Wenwei Zhuo
(74) *Attorney, Agent, or Firm* — Young Basile Hanlon & MacFarlane, P.C.

(57) ABSTRACT

A vehicle is disclosed that includes: a vehicle body defining a door frame; a vehicle door that is movably connected to the vehicle body; and an actuation system. The vehicle door includes: an inner panel that is secured to the door frame; an outer panel that is secured to the inner panel; a reinforcement that is secured between the inner panel and the outer panel; and a support bracket that is secured to the reinforcement and which includes a body with a generally planar configuration. In contrast to the door frame, which includes a metallic material, the inner panel and the outer panel each include a non-metallic material. The actuation system is connected to the vehicle door to facilitate opening and closure thereof and extends through the reinforcement and the support bracket.

20 Claims, 8 Drawing Sheets

Related U.S. Application Data

(60) Provisional application No. 63/208,429, filed on Jun. 8, 2021.

(58) Field of Classification Search
USPC .............................. 296/146.8, 146.6, 30, 56
See application file for complete search history.

(56) References Cited

U.S. PATENT DOCUMENTS

| | | |
|---|---|---|
| 9,205,728 B1 | 12/2015 | Alvarez Ruiz et al. |
| 10,300,773 B2 | 5/2019 | Miyake et al. |
| 11,407,292 B2 | 8/2022 | Kuntze et al. |
| 2004/0036318 A1* | 2/2004 | Maeda .................... B60J 5/103 296/106 |
| 2007/0096502 A1* | 5/2007 | Hakamata ................ B60J 5/101 296/146.8 |
| 2011/0061302 A1 | 3/2011 | Barral et al. |
| 2012/0228897 A1 | 9/2012 | Anderson et al. |
| 2012/0306231 A1 | 12/2012 | Ginestet et al. |
| 2013/0088046 A1 | 4/2013 | Seitz et al. |
| 2016/0167495 A1 | 6/2016 | Kamimura |
| 2020/0024881 A1 | 1/2020 | Nakamura et al. |
| 2021/0387516 A1 | 12/2021 | Moriyama |
| 2022/0009326 A1 | 1/2022 | Ramoutar et al. |
| 2022/0347900 A1 | 11/2022 | Tichy et al. |
| 2022/0379978 A1 | 12/2022 | Pencak |

FOREIGN PATENT DOCUMENTS

| | | | | |
|---|---|---|---|---|
| CN | 104290575 A | | 1/2015 | |
| CN | 209365862 U | | 9/2019 | |
| EP | 2463132 A2 | | 6/2012 | |
| JP | 2015020471 A | * | 2/2015 | .............. B60J 5/107 |
| WO | 2020110469 A1 | | 6/2020 | |

* cited by examiner

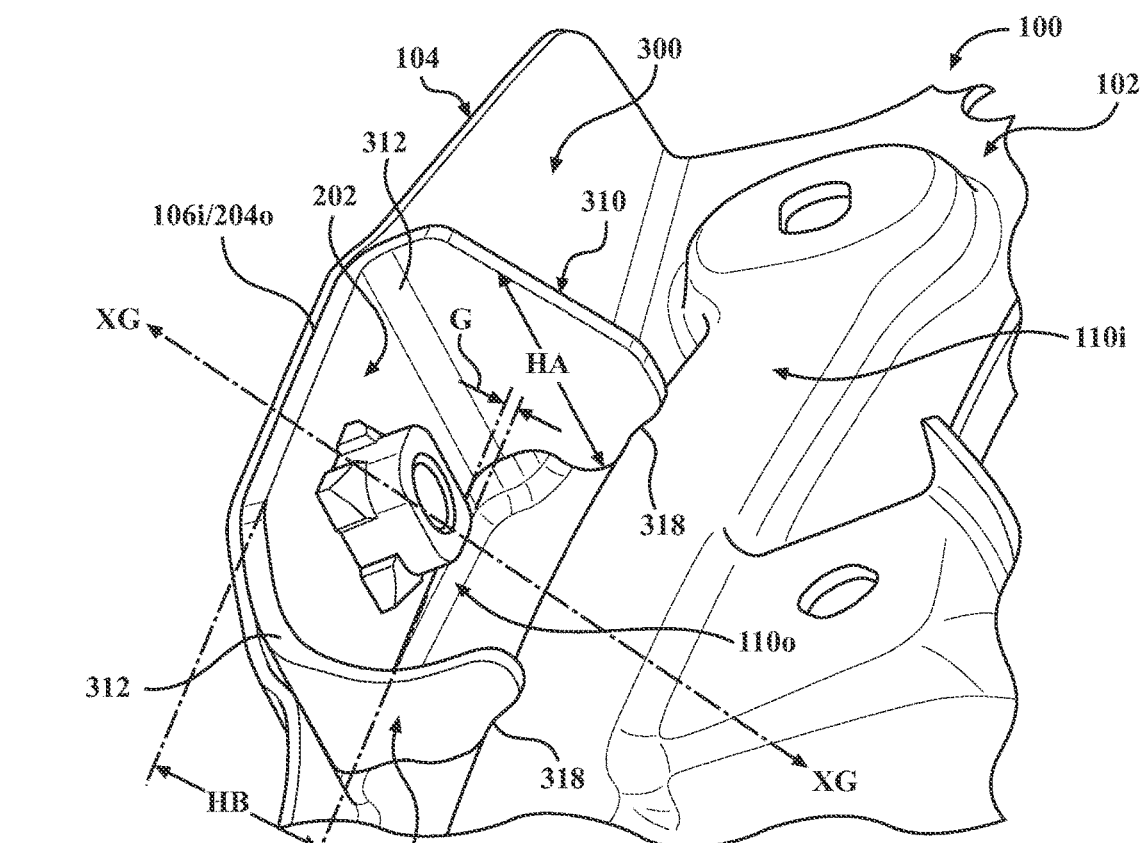
FIG. 12
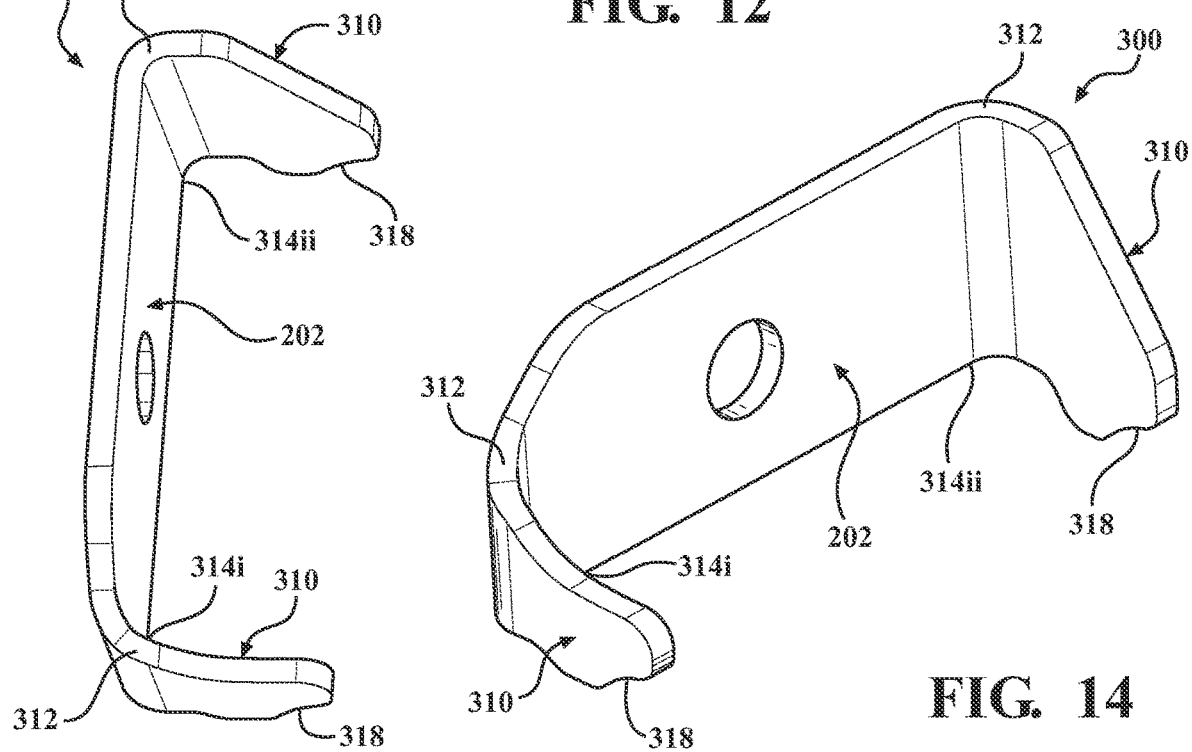
FIG. 13
FIG. 14

… (1)

REINFORCEMENTS AND SUPPORT BRACKETS FOR VEHICLE DOORS

CROSS-REFERENCE TO RELATED APPLICATION(S)

This application is a continuation of U.S. patent application Ser. No. 17/682,031, filed Feb. 28, 2022, which claims the benefit of and priority to U.S. Provisional Patent Application No. 63/208,429, filed Jun. 8, 2021, the entire disclosures of which are hereby incorporated by reference.

TECHNICAL FIELD

The present disclosure relates to force management in vehicle doors and, more specifically, to reinforcements and support brackets that improve load distribution.

BACKGROUND

Many modern vehicles include actuation (assist) systems that facilitate the opening and/or closure of doors, which often include lighter-weight (e.g., non-metallic) materials to reduce weight, cost, manufacturing and assembly complexities, etc. When subjected to higher force concentrations, however, these lighter-weight materials are sometimes subject to the formation of cosmetic and/or structural defects (e.g., bend, cracking, etc.).

To address this concern, the present disclosure describes a variety of reinforcements and support brackets that increase the structural integrity (e.g., strength, rigidity, etc.) of the associated vehicle door(s) and improve load distribution.

SUMMARY

In one aspect of the present disclosure, a vehicle is disclosed that includes: a vehicle body defining a door frame; a vehicle door that is movably connected to the vehicle body; and an actuation system. The vehicle door includes: an inner panel that is secured to the door frame; an outer panel that is secured to the inner panel; a reinforcement that is secured between the inner panel and the outer panel; and a support bracket that is secured to the reinforcement and which includes a body with a generally planar configuration. In contrast to the door frame, which includes a metallic material, the inner panel and the outer panel each include a non-metallic material. The actuation system is connected to the vehicle door to facilitate opening and closure thereof and extends through the reinforcement and the support bracket.

In certain embodiments, the support bracket may be positioned laterally inward of reinforcement.

In certain embodiments, the reinforcement may include a frame and a flange that extends outwardly from the frame towards the outer panel.

In certain embodiments, the support bracket may be secured to the flange.

In certain embodiments, the flange may define a belly that is configured to receive the support bracket.

In certain embodiments, the reinforcement may include at least one stiffener that is configured to increase the structural integrity of the vehicle door.

In certain embodiments, the support bracket may include at least one arm that extends laterally inward from the body.

In certain embodiments, the at least one arm may be secured to the at least one stiffener.

In certain embodiments, the at least one stiffener may include an outer stiffener and an inner stiffener that is positioned laterally inward of the outer stiffener.

In certain embodiments, the support bracket may be configured such that the body is spaced from the outer stiffener along an axis that extends in generally parallel relation to a height of the body.

In certain embodiments, the at least one arm may be secured to the inner stiffener.

In another aspect of the present disclosure, a vehicle door is disclosed that includes: a first panel; a second panel that is positioned outwardly of the first panel; a reinforcement that is secured between the first panel and the second panel; and a support bracket that is secured to an inner lateral face of the reinforcement.

In certain embodiments, the first panel and the second panel may each include a non-metallic material.

In certain embodiments, the reinforcement may include a frame and a flange that extends outwardly from the frame towards the second panel.

In certain embodiments, the support bracket may include a body with a generally planar configuration.

In certain embodiments, the body may be secured to the flange.

In certain embodiments, the support bracket may include at least one arm that extends laterally inward from the body.

In certain embodiments, the at least one arm may be fixedly secured to the frame.

In another aspect of the present disclosure, a vehicle door is disclosed that includes: an inner panel; an outer panel that is secured to the inner panel; a reinforcement that is secured to the inner panel such that the reinforcement is positioned between the inner panel and the outer panel; and a support bracket, wherein the inner panel and the outer panel each include a non-metallic material. The reinforcement includes: a frame with a plurality of stiffeners that are configured to increase the structural integrity of the vehicle door and a flange that extends outwardly from the frame towards the outer panel and which defines a well. The support bracket is positioned within the well and is secured to the flange. The support bracket includes: a body with a generally planar configuration and a pair of arms that extend laterally inward from the body and which are fixedly secured to the frame.

In certain embodiments, the plurality of stiffeners may include an outer stiffener and an inner stiffener that is positioned laterally inward of the outer stiffener.

In certain embodiments, the pair of arms may be fixedly secured to the inner stiffener.

In certain embodiments, the support bracket may be configured such that the body is spaced from the outer stiffener along an axis that extends in generally parallel relation to a height of the body to reduce interference with contact between the body and the flange.

BRIEF DESCRIPTION OF THE DRAWINGS

According to common practice, the various features of the drawings may not be to scale and may be arbitrarily expanded or reduced for clarity.

FIG. 12 is a partial, rear (e.g., outer), perspective view of the reinforcement and the support bracket seen in FIG. 11.

FIG. 13 is a top, perspective view of the support bracket seen in FIG. 11.

FIG. 14 is a side, perspective view of the support bracket seen in FIG. 11.

DETAILED DESCRIPTION

Figure 1:
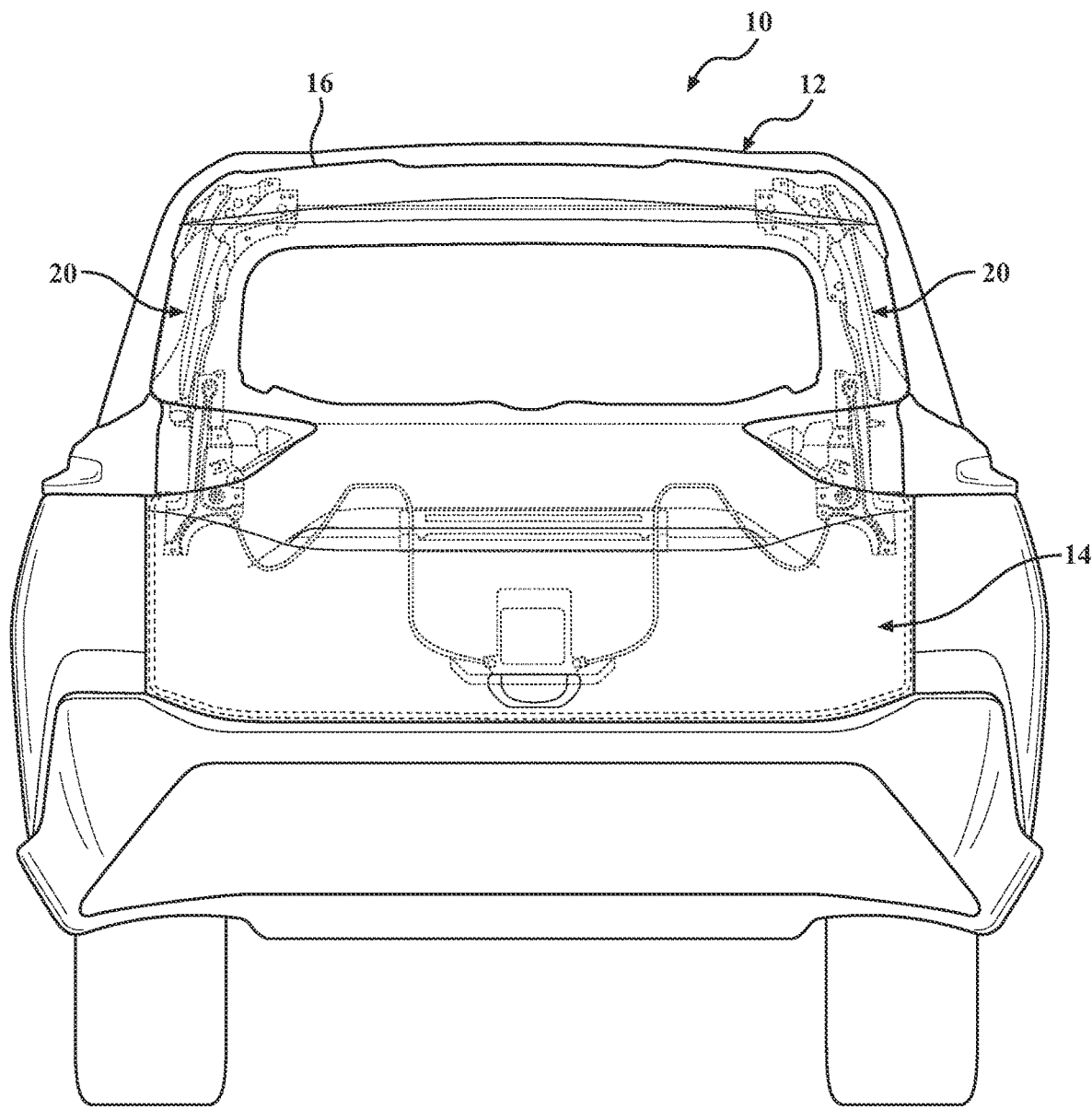
FIG. 1 is a rear (e.g., outer), plan view of a vehicle including a vehicle door according to the principles of the present disclosure.
Figure 2:
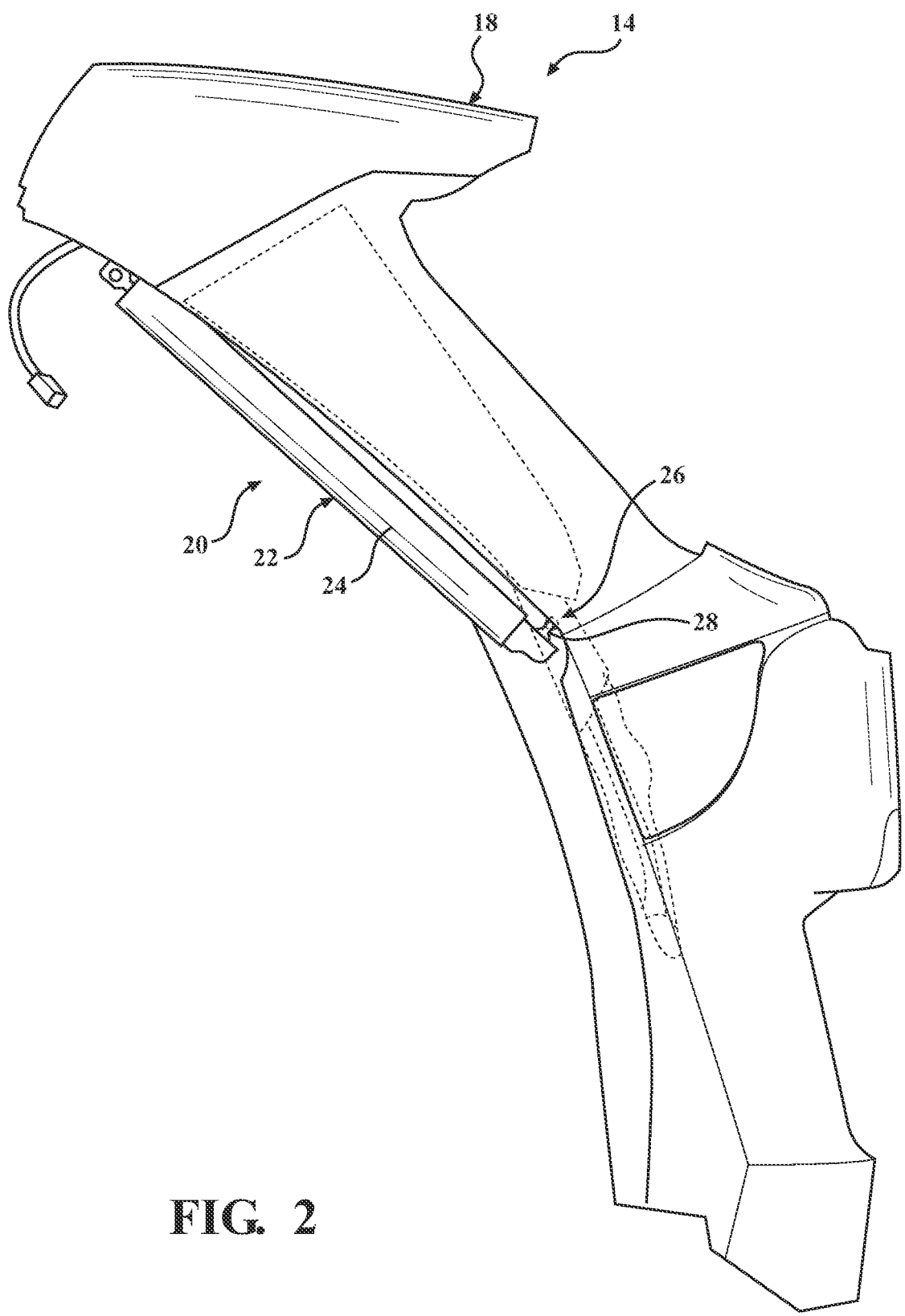
FIG. 2 is a side, plan view of the vehicle door, which includes an actuation system, an inner panel, an outer panel, one or more reinforcements, and one or more support brackets.

Throughout the present disclosure, terms such as "support," "secure," "mount," "engage," "contact," and "connect" (and variations thereof) may be used interchangeably and should each be understood as referring to a physical interface between the pertinent structures and/or components. Additionally, the term "structural integrity" should be understood as referring to the physical and/or operational characteristics of the pertinent structures and/or components, including, for example, strength, rigidity, etc.

The present disclosure relates to reinforcements and support brackets for vehicle doors that improve (increase) the structural integrity (e.g., strength, rigidity, etc.) of the associated vehicle door(s) and improve (increase) load distribution in areas that are often subjected to higher force concentrations. Although generally discussed in the context of a vehicle door (e.g., a rear hatch), it should be appreciated that the reinforcements and the support brackets described herein may be configured for use in a variety of locations, including, for example, passenger doors, tailgates, trunk lids, hoods, etc.

In one particular embodiment of the disclosure, the reinforcements and the support brackets are configured for use with an actuation system that facilitates opening and closure of the vehicle door, which includes an actuator (e.g., a power drive spindle) and a pivot member (e.g., a ball stud) that extends through the associated reinforcement and support bracket. The reinforcement(s) and the support bracket(s) thus distribute load applied to the vehicle door and thereby reduce force concentrations so as to inhibit, if not entirely prevent, the formation of cosmetic and/or structural defects (e.g., bending, cracking, etc.) in the lighter-weight (e.g., non-metallic) panels of the vehicle door at (or adjacent to) the pivot member that may otherwise occur. It should be appreciated, however, that the reinforcements and the support brackets described herein may be configured for use in any area of the vehicle that may benefit from improved (increased) structural integrity (e.g., strength, rigidity, etc.) and/or improved (increased) load distribution, such as, for example, hinges, pivot points, strikers, etc.

With general reference to FIGS. 1-10, a vehicle 10 is illustrated that includes: a vehicle body 12 and a vehicle door 14. The vehicle body 12 defines (includes) a door frame 16 and the vehicle door 14 is movably connected to (supported by or within) the door frame 16 such that the vehicle door 14 is repositionable between an open (first, raised) position and a closed (second, lowered) position. Although generally shown and described as a rear hatch 18 (FIG. 2), it should be appreciated that the vehicle door 14 may include a variety of configurations in alternate embodiments of the present disclosure. For example, it is envisioned that the vehicle door 14 may be configured as a passenger door, a tailgate, a trunk lid, a hood of the vehicle 10, etc.

Movement of the vehicle door 14 is supported (or otherwise facilitated) by one or more actuation (assist) systems 20, each of which includes an actuator 22 (FIG. 2) (e.g., a power drive spindle 24) and a pivot member 26 (FIGS. 4-6) (e.g., a ball stud 28) with a threaded end 30. The pivot member(s) 26 extend through the vehicle door 14 and engage the corresponding actuator(s) 20 (e.g., in a ball-and-socket fashion), thereby operatively connecting the actuator(s) 20 to the vehicle door 14 such that linear movement of the actuator(s) 20 causes relative rotation between the actuator(s) 20 and the pivot member(s) 26 during opening and closure of the vehicle door 14. Although illustrated as including a pair of actuation systems 20 in the particular embodiment shown throughout the figures, it should be appreciated that embodiments of the vehicle 10 including a single actuation system 20 are also envisioned herein (e.g., depending upon the particular configuration of the vehicle door 14, the location of the vehicle door 14 on the vehicle 10, etc.).

Figure 3:
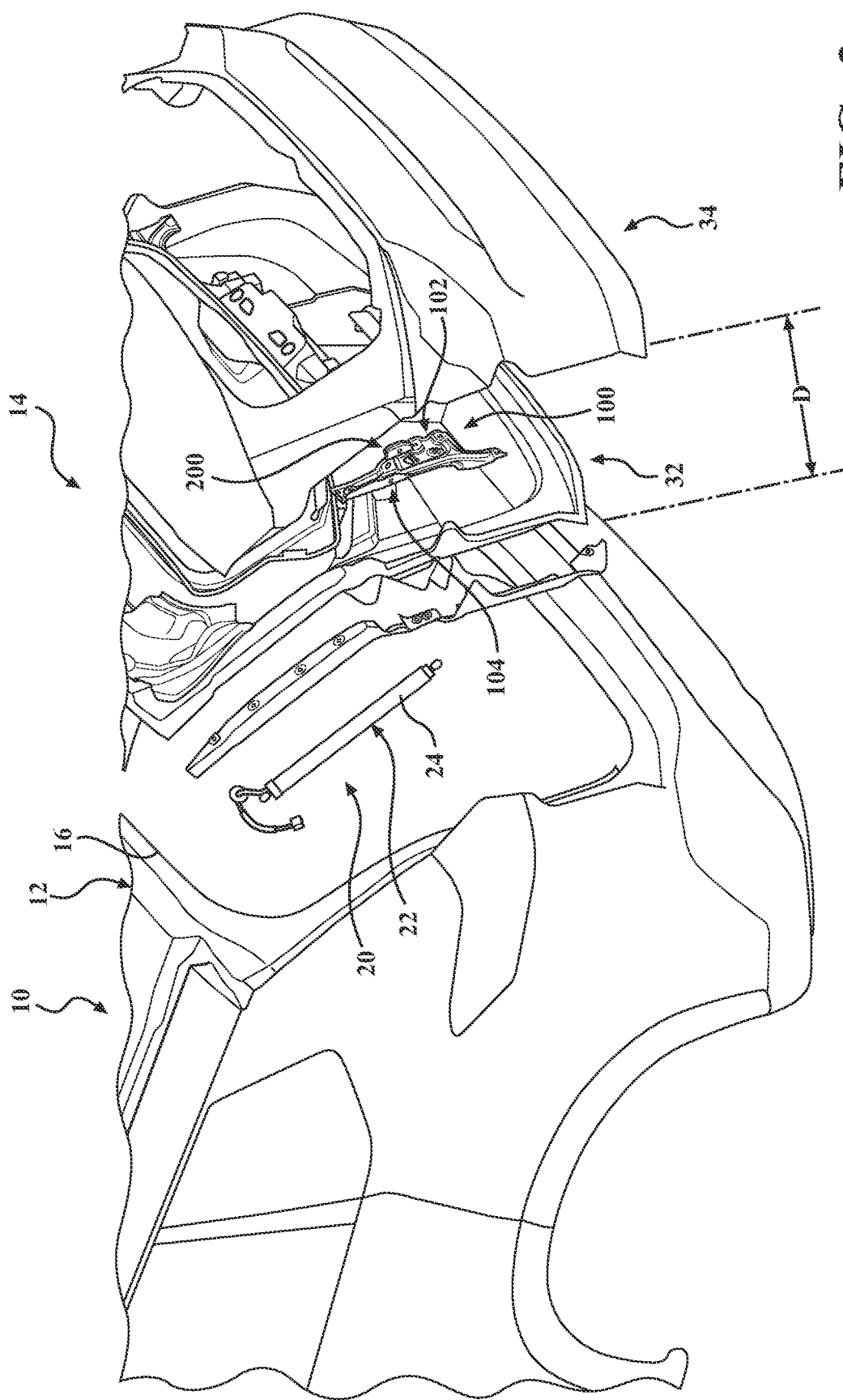
FIG. 3 is a partial, side, perspective view of the vehicle door with parts separated.
Figure 4:
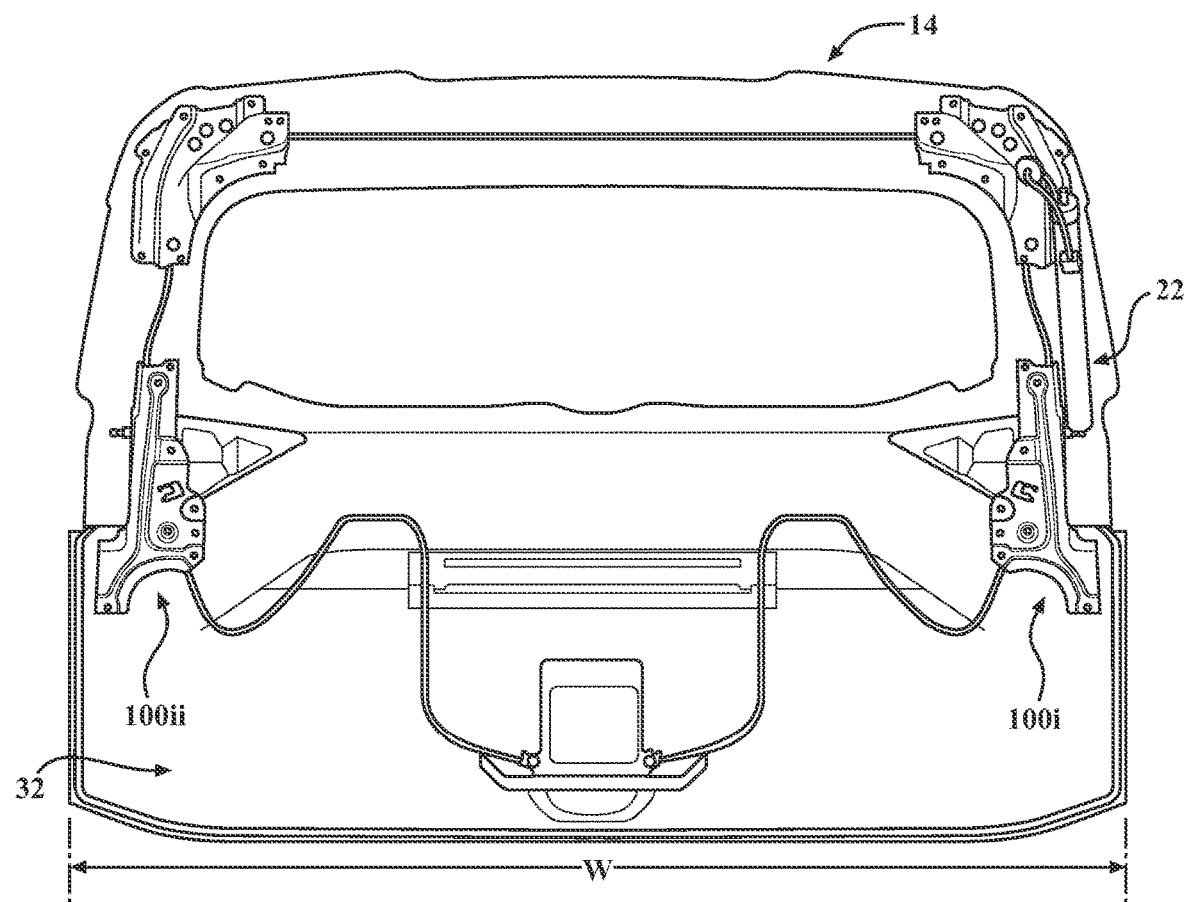
FIG. 4 is a front (e.g., inner), plan view of the vehicle door.

As seen in FIG. 3, the vehicle door 14 includes an inner (first) panel 32 that is secured to (supported by) the door frame 16, an outer (second) panel 34 that is secured to (supported by) the inner panel 32, a pair of reinforcements 100, and a pair of support brackets 200. Whereas the vehicle body 12 includes (e.g., is formed from) one or more metallic materials, the inner panel 32 and the outer panel 34 each include (e.g., are formed from) one or more non-metallic materials. For example, whereas the vehicle body 12 (e.g., the door frame 16) may include steel, it is envisioned that the inner panel 32 and the outer panel 34 may each include one or more plastic materials, polymeric materials, carbon fiber, fiberglass, composite materials, etc.

Although illustrated as including a pair of (non-identical, mirror-image) reinforcements 100i, 100ii and a pair of corresponding (identical or generally identical) support brackets 200 in the particular embodiment shown throughout the figures, it should be appreciated that embodiments of the vehicle 10 including a single reinforcement 100 and a single support bracket 200 are also envisioned herein (e.g., depending upon the particular number of actuation systems 20 included in the vehicle 10, the configuration (e.g., the size and/or weight) of the vehicle door 14, the anticipated load applied to the vehicle door 14, etc.). Additionally, while generally illustrated and described as including one or more metallic materials (e.g., steel), it is envisioned that the reinforcements 100 and the support brackets 200 may include any material or combination of materials suitable for the intended purpose of increasing the structural integrity (e.g., strength, rigidity, etc.) of the vehicle door(s) 16 and improving load distribution in the manner described herein.

The reinforcements 100 are spaced apart along a width W (FIG. 4) of the vehicle door 14 on opposite lateral sides thereof at, adjacent to, or generally adjacent to the pivot members 26 and each include a frame 102 and a flange 104.

More specifically, the reinforcements 100 are located internally within the vehicle door 14 and are configured for positioning between the inner panel 32 and the outer panel 34.

The frame 102 of each reinforcement 100 is secured (connected) to the inner panel 32 of the vehicle door 14 and extends (horizontally, transversely) in parallel (or generally parallel) relation to the width W of the vehicle door 14. While the frame 102 is illustrated as being secured (connected) to the inner panel 32 via mechanical fasteners (e.g., bolts, screws, pins, rivets, clips, etc.) in the particular embodiment shown throughout the figures, it should be appreciated that reinforcements 100 and the inner panel 32 may be secured together in any suitable manner, such as, for example, through the use of an adhesive.

The flange 104 extends (vertically or generally vertically) outward from the frame 102 along a depth (thickness) D (FIG. 3) of the vehicle door 14 (e.g., towards the outer panel 34) and is secured (connected) to a corresponding support bracket 200, as discussed in further detail below. In the particular embodiment shown throughout the figures, the flange 104 extends from the frame 102 in orthogonal (or generally orthogonal) relation. It should be appreciated, however, that the relative positions of the frame 102 and the flange 104 may be altered in various embodiments without departing from the scope of the present disclosure (e.g., depending upon spatial requirements of the vehicle door 14, the volume and/or configuration of the space between the inner panel 32 and the outer panel 34, the configuration (e.g., the size and/or weight) of the vehicle door 14, the location of the vehicle door 14 on the vehicle 10, the anticipated load applied to the vehicle door 14, etc.). The flange 104 includes respective inner and outer lateral faces 106$i$, 106$o$ (FIG. 5) and defines an opening 108 that is configured to receive one of the pivot members 26, as described in further detail below.

Figure 5:
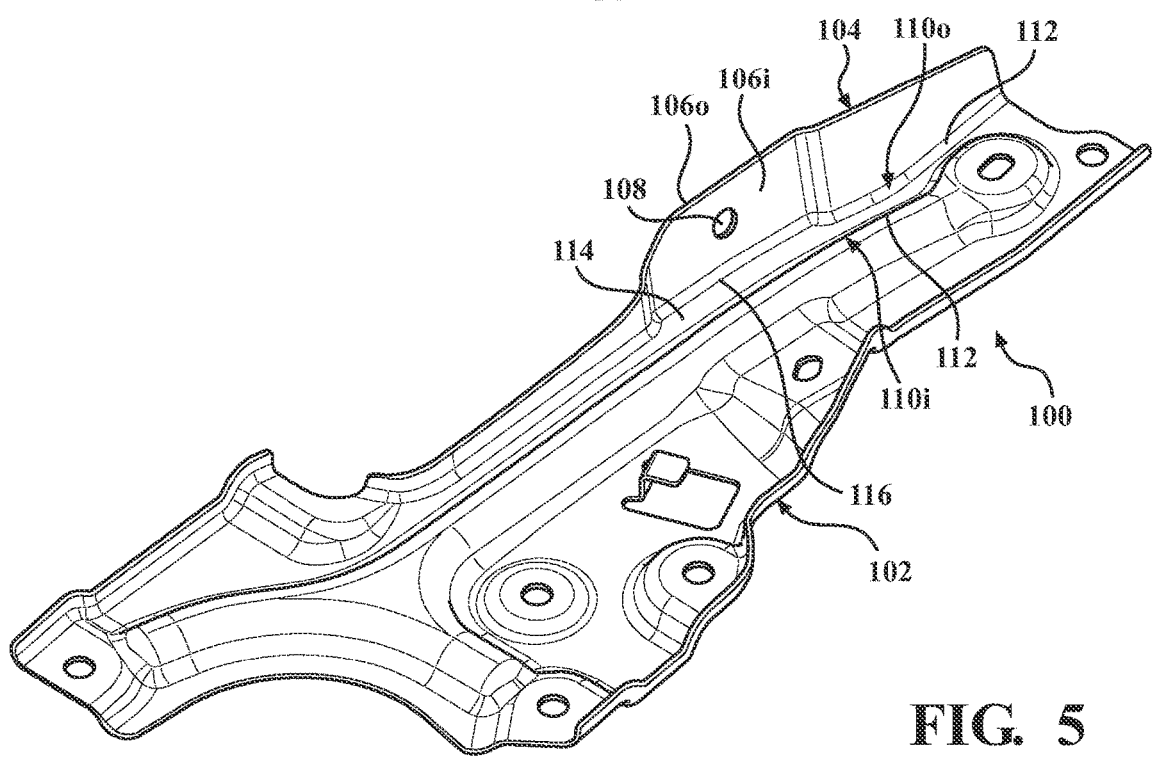
FIG. 5 is a top, perspective view of the reinforcement.
Figures 6, 7:
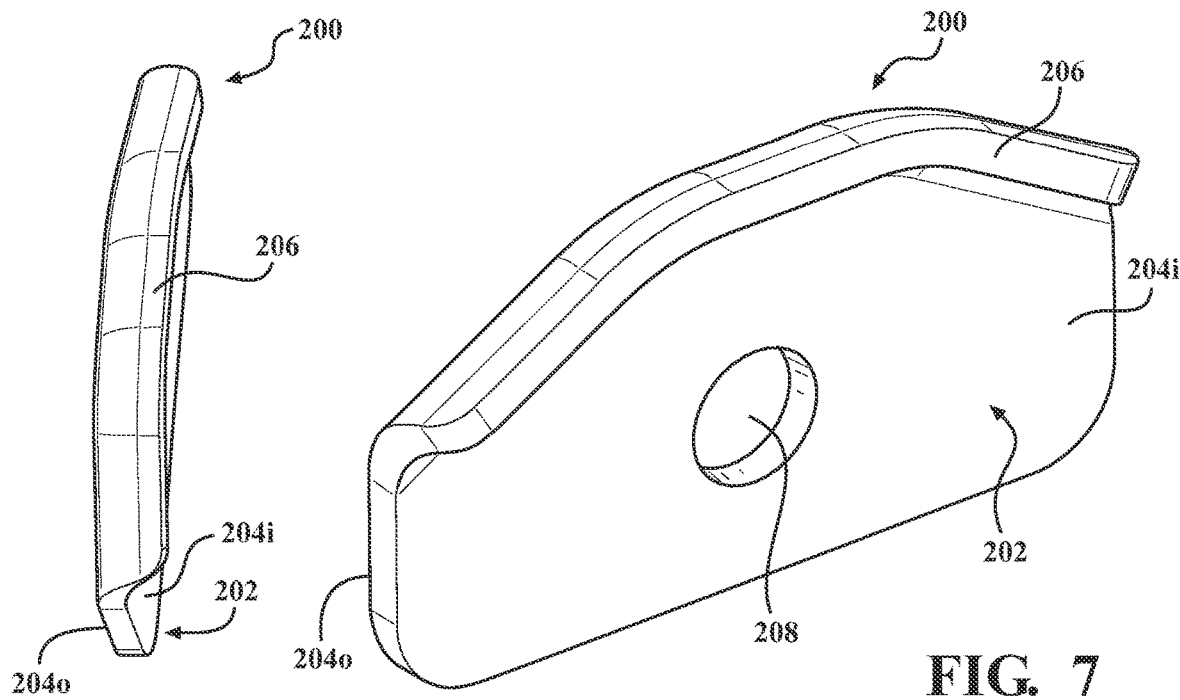
FIG. 6 is a top, perspective view of the support bracket.
FIG. 7 is a side, perspective view of the support bracket.

In certain embodiments, it is envisioned that the reinforcements 100 (e.g., the frame 102) may include one or more stiffeners 110 (e.g., beads 112), ribs, buttresses, or other such structural features to further increase the structural integrity of the vehicle door 14. For example, as discussed in further detail below, in the particular embodiment shown throughout the figures, the reinforcement 100 includes an outer stiffener 110$o$, which is positioned adjacent (or generally adjacent) to the flange 104, and an inner stiffener 110$i$, which is spaced laterally inward from the inner flange 104 (e.g., along the width W of the vehicle door 14). As seen in FIG. 5, for example, the stiffeners 110$i$, 110$o$ collectively define a channel 114 that extends along (all or a portion of) the periphery of the reinforcement 100.

Figure 8:
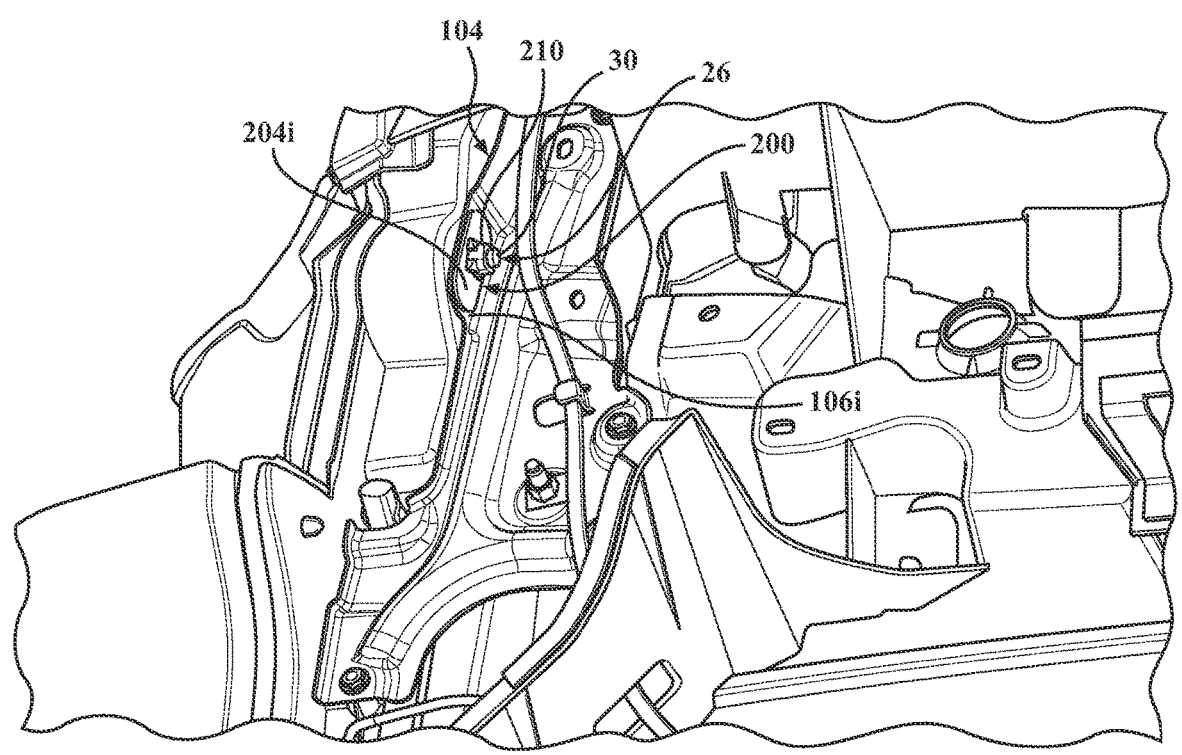
FIG. 8 is a partial, rear (e.g., outer), perspective view of the vehicle door with the reinforcement and the support bracket shown connected to the inner panel.
Figure 9:
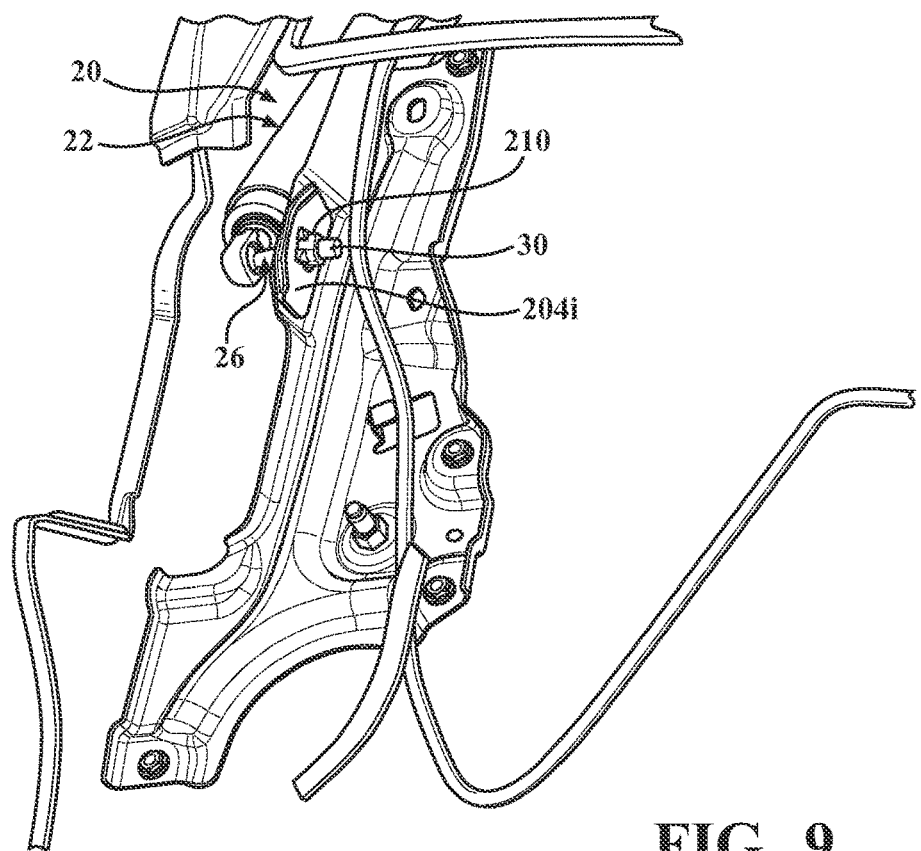
FIG. 9 is a partial, rear (e.g., outer), perspective view of the vehicle door illustrating connection of the actuation system, the reinforcement, and the support bracket.
Figure 10:
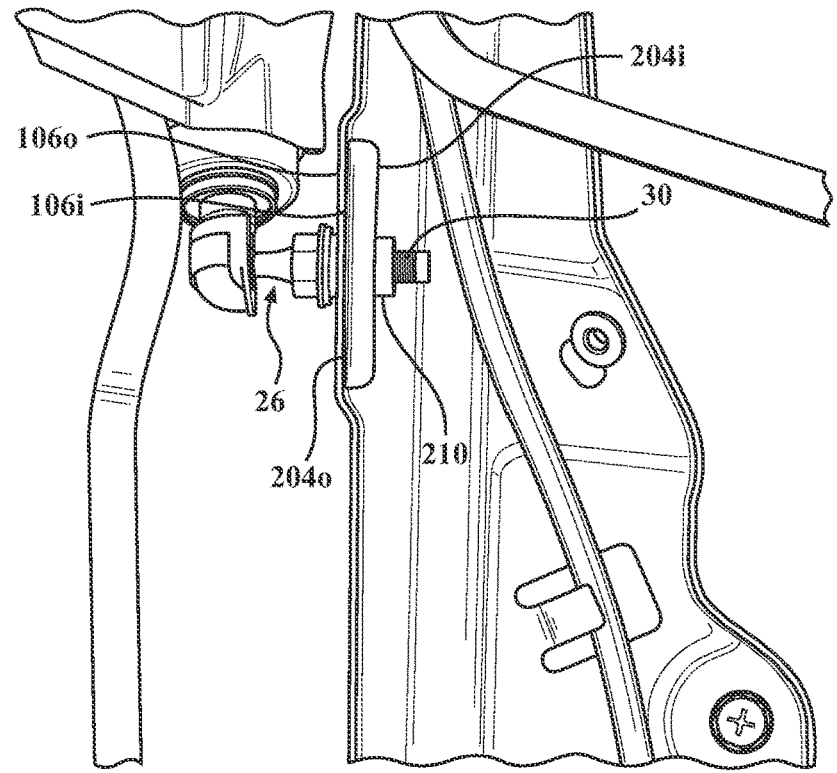
FIG. 10 is a partial, rear (e.g., outer), plan view of the vehicle door illustrating connection of the actuation system, the reinforcement, and the support bracket.
Figure 11:
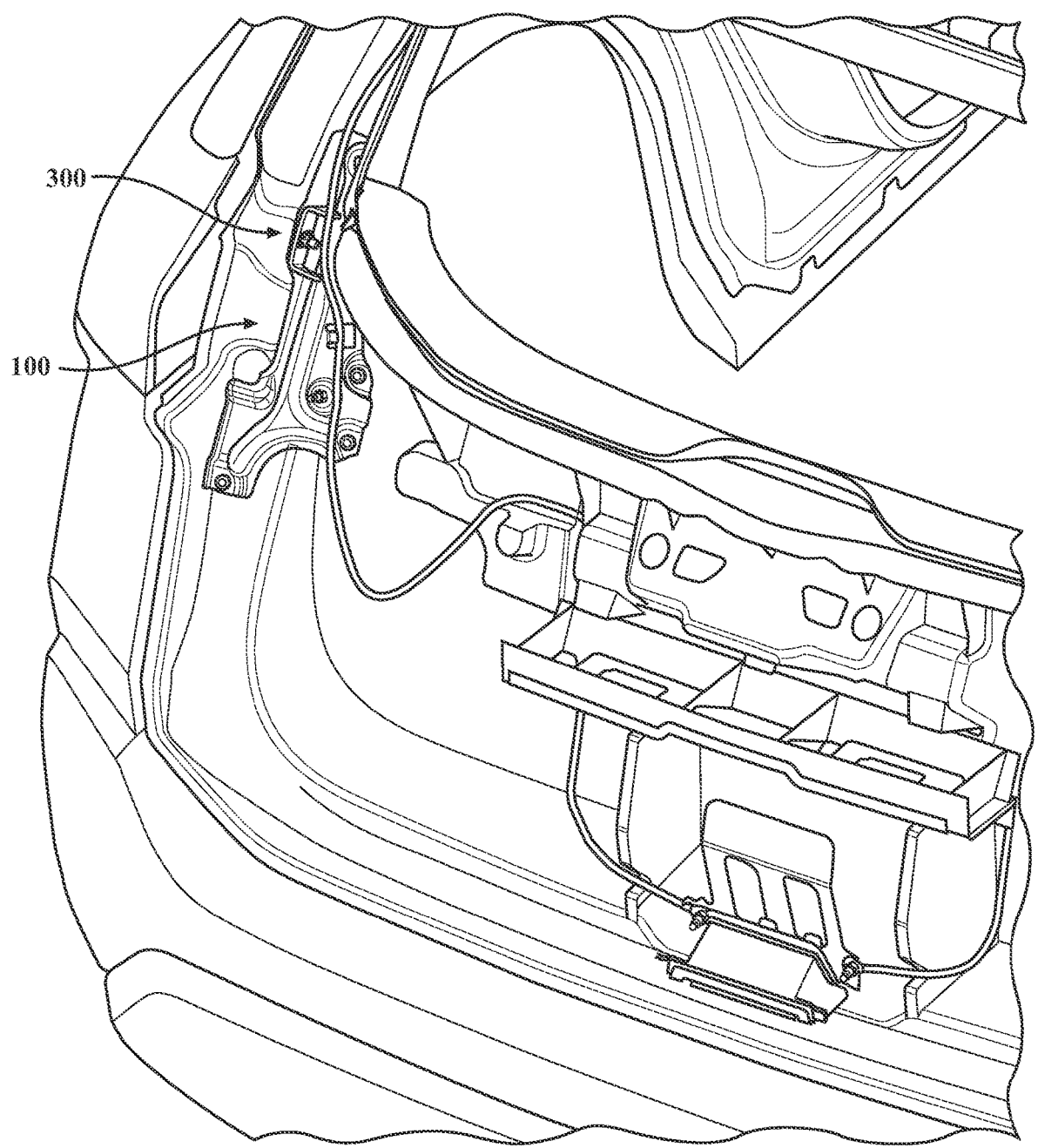
FIG. 11 is a partial, rear (e.g., outer), perspective view of the vehicle door shown with an alternate embodiment of the support bracket.

Each support bracket 200 includes a body 202 with a planar (or generally planar), plate-like configuration that defines respective inner and outer lateral faces 204$i$, 204$o$ (FIGS. 6, 7), which facilitates mating engagement (contact) between the support bracket 200 and the flange 104 (FIG. 5) of the corresponding reinforcement 100 to increase the surface area available for contact therebetween. The outer lateral face 204$o$ of each support bracket 200 is fixedly secured to the inner lateral face 106$i$ of the corresponding flange 104, as seen in FIGS. 8-10, whereby the support brackets 200 are positioned laterally inward of the corresponding reinforcement 100 (e.g., the flange 104 thereof). The support brackets 200, together with the reinforcements 100, thus distribute load applied to the vehicle door 14 and/or the actuation system 20 (e.g., the pivot member 26), such as that applied by the user during opening and/or closure, for example, thereby reducing force concentrations in the vehicle door 14 and inhibiting, if not entirely preventing, the formation of cosmetic and/or structural defects (e.g., in the outer panel 34). More specifically, each support bracket 200 is configured for positioning within (reception by) a belly (well) 116 (FIG. 5) defined by the flange 104 of the corresponding reinforcement 100. Although the support brackets 200 are illustrated as being welded to the flanges 102 in the illustrated embodiment, it should be appreciated that the support brackets 200 and the flanges 102 may be fixedly (e.g., non-movably) secured together in any suitable manner, such as, for example, through the use of an adhesive, via one or more mechanical fasteners, etc. Embodiments in which the support brackets 200 and the reinforcements 100 are integrally (e.g., unitarily, monolithically) formed are also envisioned herein.

In the particular embodiment of the disclosure seen in FIGS. 1-10, each support bracket 200 includes a rib 206 (or other such stiffening member) that extends laterally inward (transversely) from the body 202 (e.g., away from the corresponding actuator 22) so as to increase the structural integrity (e.g., strength, rigidity, etc.) of the support bracket 200 and, thus, the vehicle door 14. Embodiments of the support bracket 200 devoid of the rib 206, however, would not be beyond the scope of the present disclosure (e.g., depending upon spatial requirements of the vehicle door 14, the volume and/or configuration of the space between the inner panel 32 and the outer panel 34, the configuration (e.g., the size and/or weight) of the vehicle door 14, the location of the vehicle door 14 on the vehicle 10, the anticipated load applied to the vehicle door 14 etc.).

Each support bracket 200 includes an opening 208 (FIG. 7) that extends through the body 202 and a nut 210 that is secured to the inner lateral face 204$i$. The opening 208 is located such that, upon connection of the support bracket 200 to the flange 104 of the corresponding reinforcement 100, the opening 208 is positioned in registration (alignment) with the opening 108 (FIG. 5).

The nut 210 includes internal threading (not shown) and is secured to the body 202 such that the nut 210 is positioned in registration (alignment) with the opening 208 and, thus, the opening 108 extending through the flange 104 of the corresponding reinforcement 100. Alignment of the nut 210 with the openings 108, 208 allows for insertion of a corresponding pivot member 26 through the reinforcement 100 and the support bracket 200 to facilitate engagement between the threaded end 30 of the pivot member 26 and the internal threading on the nut 210. Although the nuts 210 are illustrated as being welded to the inner lateral faces 204$i$ of the support brackets 200 in the illustrated embodiment, it should be appreciated that the nuts 210 and the support brackets 200 may be fixedly (e.g., non-movably) secured together in any suitable manner, such as, for example, through the use of an adhesive, via one or more mechanical fasteners, etc. Embodiments in which the support brackets 200 and the nuts 210 are integrally (e.g., unitarily, monolithically) formed are also envisioned herein.

With continued reference to FIGS. 1-10, assembly of the vehicle door 14 will be discussed. During assembly, the nut(s) 210 (FIGS. 8-10) are fixedly secured (e.g., welded) to the inner lateral face(s) 204$i$ of the support bracket(s) 200 and the outer lateral face(s) 204$o$ of the support bracket(s) 200 are fixedly secured (e.g., welded) to the inner lateral face(s) 106$i$ of the flange(s) 102. The reinforcement(s) 100 are then secured to the inner panel 32 of the vehicle door 14 (e.g., using one or more mechanical fasteners, adhesives, etc.) and the outer panel 34 of the vehicle door 14 is secured to the inner panel 32 (e.g., using one or more mechanical fasteners, adhesives, etc.) such that the reinforcement(s) 100, the support bracket(s) 200, and the nut(s) 210 are located therebetween. The pivot member(s) 26 are then inserted through the reinforcement(s) 100 and the support bracket(s) 200 (via the respective openings 108, 208) and are threaded to the nut(s) 210, which distributes load applied to the vehicle door 14 (e.g., via the pivot member(s) 26) during opening and/or closure, thereby reducing force concentrations and inhibiting (if not entirely preventing) the formation of any cosmetic and/or structural defects in the vehicle door 14 (e.g., in the outer panel 34) that may otherwise occur. The vehicle door 14 is then connected to the vehicle body 12, after which, the actuator(s) 22 are connected to the pivot member(s) 26.

With reference now to FIGS. 11-14, another embodiment of the presently disclosed support bracket is illustrated, which is identified by the reference character 300. The support bracket 300 is substantially similar to the support bracket 200 discussed above (FIGS. 1-10) and, accordingly, will only be discussed with respect to any differences therefrom in the interest of brevity. As such, identical reference characters will be utilized to refer to elements, structures, features, etc., common to the support brackets 200, 300.

Each support bracket 300 includes at least one arm 310 (e.g., a gusset or other such extension) that extends laterally inward (transversely) from the body 202 (e.g., away from the corresponding actuator 22). In the particular embodiment shown throughout the figures, the support brackets 300 each include a pair of (identical or generally identical) arms 310 that extend from the body 202 in orthogonal (or generally orthogonal) relation so as to define arcuate (non-linear, radiused) transitions 312. Embodiments in which the transitions 312 may include a rectilinear configuration are also contemplated herein, however. For example, it is envisioned that the arms 310 may extend from the body 202 so as to define elbows (e.g., corner sections) of (approximately) 90 degrees. Embodiments of the disclosure in which each support bracket 300 may include a single arm 310 are also contemplated herein. In such embodiments, it is envisioned that the (single) arm 310 may be positioned equidistant from opposing lateral ends 314$i$, 314$ii$ of the body 202 (e.g., such that the arm 310 is centered or generally centered along the body 202). Alternatively, it is envisioned that the arm 310 may be positioned eccentrically (e.g., such that the arm 310 is spaced unequally between the ends 314$i$, 314$ii$ of the body 202).

As seen in FIG. 12, each support bracket 300 is configured such that a gap (space) G is defined between the outer stiffener 110$o$ and the body 202 (and the arm(s) 310). The gap G extends along an axis XG that is parallel (or generally parallel) in relation to a height HB of the body 202 of the support bracket 200 (and the flange 104), which inhibits (reduces), if not entirely prevents, interference between the arm(s) 310 and the outer stiffener 110$o$ so as not to compromise (negatively influence) engagement (contact) between the outer lateral face 204$o$ of the support bracket 300 and the inner lateral face 106$i$ of the flange 104.

The arm(s) 310 each define a (vertical) height HA that increases with distance from the body 202 such that each arm 310 defines a corresponding foot 316 that is configured for fixed (secured) connection to (engagement, contact with) the frame 102 of the corresponding reinforcement 100. For example, in the illustrated embodiment, the arms 310 are configured for fixed connection to the inner stiffener 110$i$. It should be appreciated, however, that the arm(s) 310 may be secured (connected) to any suitable section or component of the corresponding reinforcement 100 in various embodiments without departing from the scope of the present disclosure (e.g., depending upon spatial requirements of the vehicle door 14 (FIGS. 1-3), the volume and/or configuration of the space between the inner panel 32 and the outer panel 34, the configuration (e.g., the size and/or weight) of the vehicle door 14, the location of the vehicle door 14 on the vehicle 10, the anticipated load applied to the vehicle door 14, etc.). Securement of the arm(s) 310 to the frame 102 further improves (increases) the structural integrity (e.g., strength, rigidity, etc.) of the support bracket 300 (e.g., compared to the support bracket 200) by further reducing bending, twisting, or other such deformation that may otherwise occur under an applied load.

To facilitate connection of the feet 316 to the stiffener 110$i$, in certain embodiments, such as that shown throughout the figures, it is envisioned that each foot 316 may define a recess 318 (e.g., a cutout) (FIGS. 12-14) with a contour corresponding to that defined by the stiffener 110$i$. As such, depending upon the particular configuration of the stiffener 110$i$, it is envisioned that the recesses 318 may include a configuration that is defined by one or more non-linear (e.g., arcuate) segments, as seen in FIGS. 12-14, one or more linear segments, or a combination thereof.

Although the arms 310 (e.g., the feet 316) of the support bracket 300 are illustrated as being welded to the stiffener 110$i$ in the illustrated embodiment, it should be appreciated that the arm(s) 310 may be fixedly (e.g., non-movably) secured to the corresponding reinforcement 100 in any suitable manner, such as, for example, through the use of an adhesive, via one or more mechanical fasteners, etc. Embodiments in which the arm(s) 310 may be integrally (e.g., unitarily, monolithically) formed with the corresponding reinforcement 100 are also envisioned herein.

In certain embodiments, the support bracket is secured to the reinforcement such that the support bracket is exposed relative to the reinforcement.

In certain embodiments, connecting the support bracket to the reinforcement includes connecting the support bracket to the reinforcement such that the support bracket is exposed relative to the reinforcement.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "forward," "rear," etc. (and variations thereof), should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass no variation in the appurtenant range or concept with whey they are associated as well as variations on the order of up to 25% (e.g., to allow for manufacturing tolerances and/or deviations in design).

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
   a vehicle door including:
      an inner panel;
      an outer panel secured to the inner panel;
      a reinforcement mechanically connected to the inner panel via fasteners such that the reinforcement is secured between the inner panel and the outer panel; and
      a support bracket secured to the reinforcement, wherein the support bracket is exposed relative to the reinforcement; and
   an actuation system configured to facilitate movement of the vehicle door, wherein the actuation system extends through the reinforcement and the support bracket such that the reinforcement and the support bracket distribute load applied during movement of the vehicle door to thereby reduce force concentrations and inhibit defect formation in the outer panel.

2. The vehicle of claim 1, wherein the inner panel and the outer panel each include a non-metallic material.

3. The vehicle of claim 1, wherein the support bracket is positioned laterally inward of the reinforcement.

4. The vehicle of claim 1, wherein the support bracket includes:
   a body with an overall plate-like configuration; and
   a nut secured to the body.

5. The vehicle of claim 4, wherein the actuation system includes:
   an actuator; and
   a pivot member engaging the actuator.

6. The vehicle of claim 5, wherein the actuator is configured to receive the pivot member such that the pivot member extends into the actuator.

7. The vehicle of claim 6, wherein the pivot member is configured as a ball stud.

8. The vehicle of claim 5, wherein the pivot member extends through the reinforcement and the support bracket.

9. The vehicle of claim 8, wherein the pivot member engages the support bracket.

10. The vehicle of claim 9, wherein the pivot member threadably engages the support bracket.

11. A vehicle comprising:
    a vehicle door including:
       an inner panel including a non-metallic material;
       an outer panel secured to the inner panel and including a non-metallic material;
       a reinforcement mechanically connected to the inner panel via fasteners such that the reinforcement is secured between the inner panel and the outer panel; and
       a support bracket secured to the reinforcement, wherein the support bracket is exposed relative to the reinforcement and includes:
          a body; and
          a nut secured to the body; and
    an actuation system configured to facilitate movement of the vehicle door, wherein the actuation system includes:
       an actuator; and
       a pivot member extending through the body and through the reinforcement to distribute load applied during movement of the vehicle door to thereby reduce force concentrations and inhibit defect formation in the outer panel, wherein the pivot member includes a first end connected to the nut and a second end engaging the actuator.

12. The vehicle of claim 11, wherein the reinforcement includes:
    a frame; and
    a flange extending outwardly from the frame towards the outer panel.

13. The vehicle of claim 12, wherein the support bracket is secured to the flange.

14. The vehicle of claim 11, wherein the first end of the pivot member is threadably connected to the nut.

15. The vehicle of claim 11, wherein the pivot member is configured as a ball stud.

16. A method of assembling a vehicle door, the method comprising:
    mechanically connecting a reinforcement to an inner panel of the vehicle door via fasteners;
    connecting a support bracket to the reinforcement such that the support bracket is exposed relative to the reinforcement;

inserting an actuation system through the reinforcement and the support bracket such that the reinforcement and the support bracket distribute load applied during operation of the actuation system to thereby reduce force concentrations and inhibit defect formation in the vehicle door; and connecting an outer panel of the vehicle door to the inner panel such that the reinforcement and the support bracket are positioned therebetween.

17. The method of claim 16, wherein connecting the support bracket to the reinforcement includes positioning the support bracket laterally inward of the reinforcement.

18. The method of claim 16, further including:
connecting the actuation system to the support bracket.

19. The method of claim 18, wherein connecting the actuation system to the support bracket includes connecting a pivot member to the support bracket such that the pivot member extends through the reinforcement and the support bracket.

20. The method of claim 19, wherein connecting pivot member to the support bracket includes threadably connecting the pivot member to a nut on the support bracket.

* * * * *